United States Patent [19]
Zenda

[11] Patent Number: 5,826,044
[45] Date of Patent: Oct. 20, 1998

[54] DISPLAY CONTROL SYSTEM HAVING A PCMCIA INTERFACE

[75] Inventor: Hiroki Zenda, Tokyo, Japan

[73] Assignee: Kabushiki Kaisha Toshiba, Kawasaki, Japan

[21] Appl. No.: 458,690

[22] Filed: Jun. 2, 1995

[30] Foreign Application Priority Data

Jun. 6, 1994 [JP] Japan .................................. 6-124109
Feb. 27, 1995 [JP] Japan .................................. 7-038630

[51] Int. Cl.$^6$ ........................................... C06F 13/00
[52] U.S. Cl. .................................. 395/282; 395/311
[58] Field of Search ............................ 395/856, 836, 395/311, 282

[56] References Cited

U.S. PATENT DOCUMENTS 4,697,232 9/1987 Brunelle et al. .................. 364/200
5,410,717 4/1995 Floro .................................. 395/800
5,420,988 5/1995 Elliott .................................. 395/275
5,444,497 8/1995 Takeuchi ............................ 395/166

FOREIGN PATENT DOCUMENTS 6-59648 3/1994 Japan .

Primary Examiner—Jack B. Harvey
Assistant Examiner—David A. Wiley
Attorney, Agent, or Firm—Finnegan, Henderson, Farabow, Garrett & Dunner, L.L.P.

[57] ABSTRACT

A portable computer comprising a PCMCIA card connector, a PCMCIA controller, a multimedia display controller, a moving-picture bus, a system bus, and a switching control circuit. The PCMCIA controller controls transfer of data to and from a PC card connected to the PCMCIA card connector. The multimedia display controller can process moving-picture data to display moving pictures. The moving-picture bus connects the PCMCIA controller and the multimedia display controller, for supplying moving-picture data only. The switching control circuit is incorporated in the PCMCIA controller, for connecting the PCMCIA card connector to the moving-picture bus or to the system bus.

21 Claims, 9 Drawing Sheets

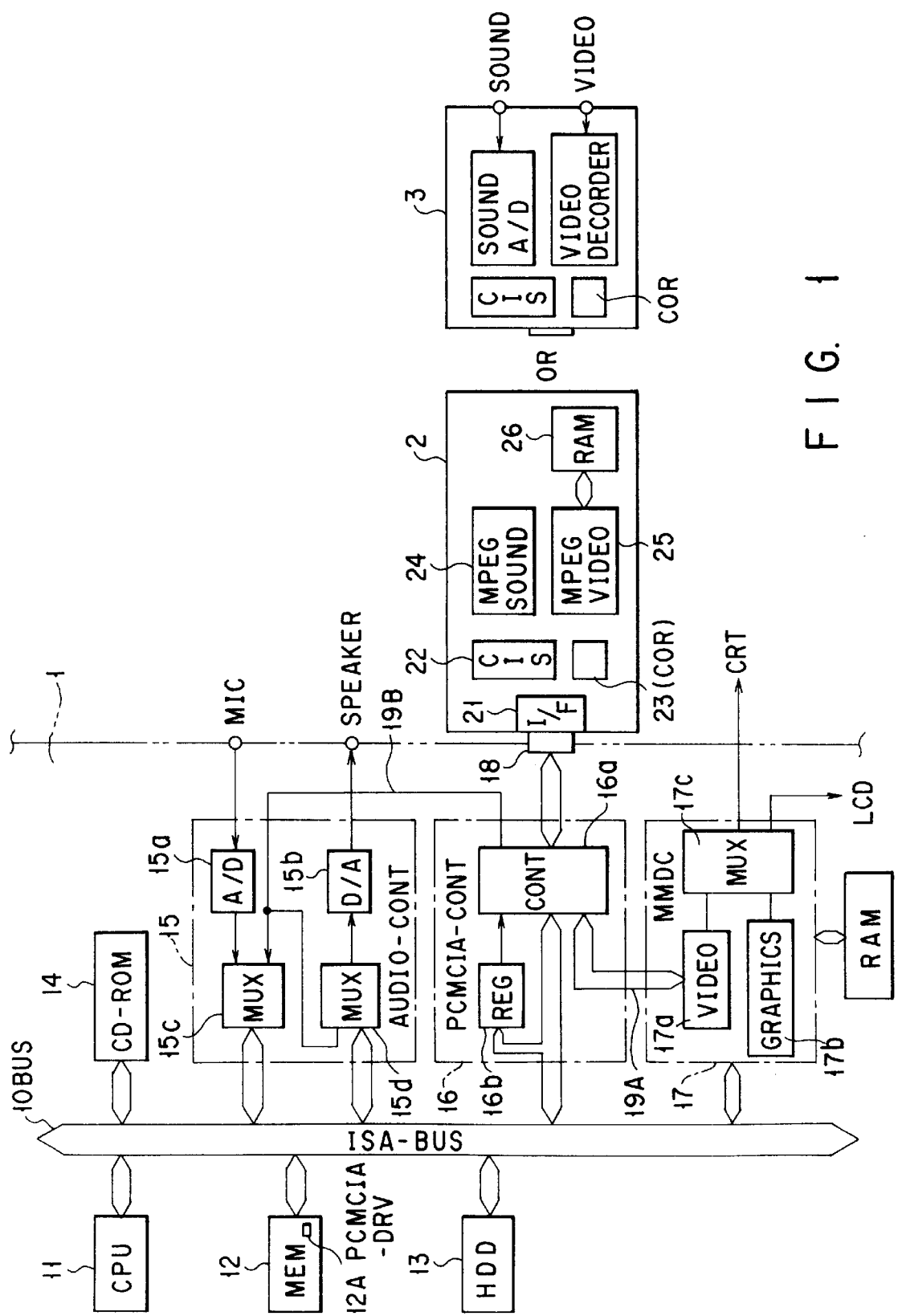
F I G. 1

| I/O CARD INTERFACE | | | NOTE | I/O CARD INTERFACE | | | NOTE |
|---|---|---|---|---|---|---|---|
| PIN | SIGNAL NAME | I/O | FUNCTION | PIN | SIGNAL NAME | I/O | FUNCTION | |
| 1 | GND | | GROUND | 35 | GND | | GROUND | |
| 2 | D3 | I/O | DATA3 | 36 | -CD1 | O | CARD DETECTION | |
| 3 | D4 | I/O | DATA4 | 37 | D11 | I/O | DATA11 | |
| 4 | D5 | I/O | DATA5 | 38 | D12 | I/O | DATA12 | |
| 5 | D6 | I/O | DATA6 | 39 | D13 | I/O | DATA13 | |
| 6 | D7 | I/O | DATA7 | 40 | D14 | I/O | DATA14 | |
| 7 | -CE1 | I | CARD ENABLE | 41 | D15 | I/O | DATA15 | |
| 8 | A10 | I | ADDRESS10 | 42 | -CE2 | I | CARD ENABLE | |
| 9 | -OE | I | OUTPUT ENABLE | 43 | RFSH | I | REFLESH | |
| 10 | A11 | I | ADDRESS11 | 44 | -IORD | I | I/O READ | 2 |
| 11 | A9 | I | ADDRESS9 | 45 | -IOWR | I | I/O WRITE | 2 |
| 12 | A8 | I | ADDRESS8 | 46 | A17 | I | ADDRESS17 | |
| 13 | A13 | I | ADDRESS13 | 47 | A18 | I | ADDRESS18 | |
| 14 | A14 | I | ADDRESS14 | 48 | A19 | I | ADDRESS19 | |
| 15 | -WE/-POM | I | WRITE ENABLE | 49 | A20 | I | ADDRESS20 | |
| 16 | -IREQ | O | INTERRUPT REQUEST | 2 | 50 | A21 | I | ADDRESS21 | |
| 17 | VCC | | OPERATIONAL POWER SUPPLY | | 51 | VCC | | OPERATIONAL POWER SUPPLY | |
| 18 | VPP1 | | POWER SUPPLY FOR PROGRAM AND PERIPHERALS | 2,3 | 52 | VPP2 | | POWER SUPPLY FOR PROGRAM AND PERIPHERALS | 2,4 |
| 19 | A16 | O | ADDRESS16 | 53 | A22 | I | ADDRESS22 | |
| 20 | A15 | I | ADDRESS15 | 54 | A23 | I | ADDRESS23 | |
| 21 | A12 | I | ADDRESS12 | 55 | A24 | I | ADDRESS24 | |
| 22 | A7 | I | ADDRESS7 | 56 | A25 | I | ADDRESS25 | |
| 23 | A6 | I | ADDRESS6 | 57 | RFU | | RESERVED | |
| 24 | A5 | I | ADDRESS5 | 58 | +RESET | I | RESET | 1 |
| 25 | A4 | I | ADDRESS4 | 59 | -WAIT | O | WAIT | 1 |
| 26 | A3 | I | ADDRESS3 | 60 | -INPACK | O | INPUT RESPONSE | 2 |
| 27 | A2 | I | ADDRESS2 | 61 | -REG | I | ATTRIBUTE MEMORY SPACE SELECT | 2 |
| 28 | A1 | I | ADDRESS1 | 62 | -SPKR | O | DIGITAL SPEECH SIGNAL | 2 |
| 29 | A0 | I | ADDRESS0 | 63 | -STSCHG | O | CARD STATE CHANGE | |
| 30 | D0 | I/O | DATA0 | 64 | D8 | I/O | DATA8 | |
| 31 | D1 | I/O | DATA1 | 65 | D9 | I/O | DATA9 | |
| 32 | D2 | I/O | DATA2 | 66 | D10 | I/O | DATA10 | |
| 33 | -IOIS16 | O | 16-BIT I/O PORT | 2 | 67 | -CD2 | O | CARD DETECTION | |
| 34 | GND | | GROUND | 68 | GND | | GROUND | |

FIG. 2

| PCMCIA | CAPTURE | MPEG1 |
|---|---|---|
| (A) { A25-A18<br>A17-A10<br>A9<br>A8<br>A7<br>-IOIS16 | ← Y7-0<br>← UV7-0<br>← HREF ORHS<br>← VS<br>← (LLC2)<br>← ODD | ← PD23(B)<br>← PD15(GY)<br>← PD7(RC)<br>→ HSYNC<br>→ VSYNC<br>→ PCLK<br>→ — |
| A6-A0<br>D15-0 | —<br>— | → A20-0<br>↔ D15-0 |
| (B) { -SPKR<br>-INPACK<br>-STSCHG | ← SDATA<br>← FSYNC<br>← SCK | |

SYSTEM ← CARD

F I G. 3

F I G. 5A SCK

16 CLOCKS | 16 CLOCKS

F I G. 5B FSYNC

F I G. 5C SDATA

MSB 15 14 13 12 2 1 0 LSB MSB 15 14 13 12 2 1 0 15 LSB

LEFT | RIGHT

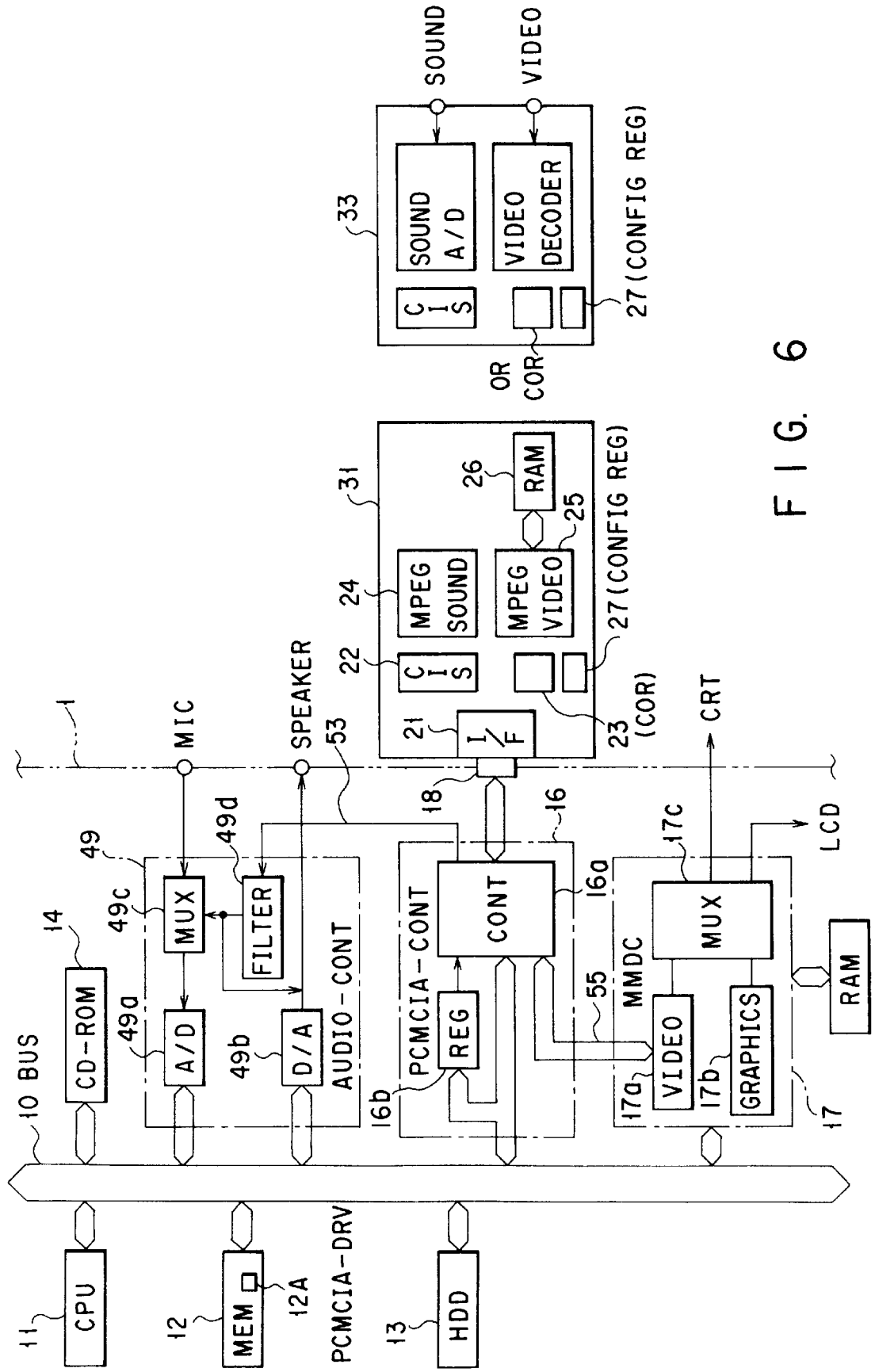
F I G. 6

| STANDARD MODE | | | MULTMIMEDIA MODE | |
|---|---|---|---|---|
| SIGNAL NAME | I/O | SIGNAL NAME | I/O | COMMENTS |
| A25-18 | I | Y7-0 | O | VIDEO YUV-4:2:2 PIXEL |
| A17-10 | I | UV7-0 | O | |
| A9 | I | HREF | O | HORIZONTAL SYNC. |
| A8 | I | VSYNC | O | VERTICAL SYNC. |
| A7 | I | PCLK | O | PIXEL CLOCK |
| -SPKR | O | LEFT | O | AUDIO LEFT PWM SIGNAL |
| -INPACK | O | RIGHT | O | RIGHT PWM SIGNAL |

FIG. 7

DISPLAY CONTROL SYSTEM HAVING A PCMCIA INTERFACE

BACKGROUND OF THE INVENTION

1. Field of the Invention

The present invention relates to a portable computer which has a card connection port and which can process moving-picture data by the use of a card connected to the card connection port, and also to a card for use in combination with the portable computer.

2. Description of the Related Art

In recent years, technology of portable computers has advanced, developing computers called "multimedia personal computers." A multimedia personal computer can display not only text data and graphics data, but also image data such as moving pictures and still pictures. To display image data, use is made of YUV signals which have been hitherto utilized in TV sets and VTRs. More specifically, an option board is connected to the personal computer to display the image data, whereas the RGB display circuit incorporated in the personal computer operates to display text data or graphics data. Among such option boards available is CL-450 (reg. trademark) development board manufactured by C-Cube Microsystems, U.S.A. This board uses MPEG (Moving Picture Coding Experts Group) video algorithm, expanding MPEG compress video signals and converting YUV signals into RGB signals, and outputs the RGB signals thus generated.

MPEG is the abbreviation for an organization subordinate to JTC1 (Joint Technical Committee) which is sponsored by ISO (International Organization for Standardization) and IEC (International Electrotechnical Commission). MPEG sometimes means the coding scheme employed to accumulate color image data. Two MPEG coding schemes are available. The first scheme known as MPEG-1 is designed for application to CD-ROMs, with data transfer speed of 1.5 MB/sec. or less. The second scheme known as MPEG-2 is designed for processing high-quality image data, with data transfer speed ranging from 5 MB/sec. to 10 MB/sec.

Another of the option boards available is DVI (Digital Video Interactive) board manufactured by Intel, Inc., U.S.A. The DVI board has a 82750PB chip for compressing and expanding image data, a VRAM for storing image data, and a 8275DB chip for controlling the image data display.

If such an option board is connected to the personal computer, the computer will have two display sub-systems, i.e., the RGB sub-system incorporated in the computer and the YUV sub-system mounted on the option board. The resultant circuit configuration is obviously redundant.

Advanced laptop portable computers have a flat-panel display such as a TFT color LCD. It is desired that the flat-panel display displays not only text data and graphic data but also image data such as moving pictures and still pictures, in any combination thereof.

Recently, personal computers having a slot for a PC card which conforms with the standards of JEIDA and the standards of PCMCIA (Personal Computer Memory Card International Association) are used in increasing numbers. Various devices have been developed to use this PC card in combination with a moving-picture capture card, an MPEG decoder and the like, which controls input and output of moving-picture data.

To use a PC card, a personal computer of the conventional standard bus specification (e.g., an ISA bus computer), the speed with which image data can be transferred through the bus is too low to display images having a resolution comparable with that of images the TV sets of NTSC system can display. The image data must therefore be processed at low speed, inevitably displaying images of low quality (i.e., low resolution). In order to display image of higher quality, it is necessary to replace the ISA bus with a high-speed bus such as CPI (Peripheral Component Interconnect) bus.

As described above, the personal computer of the conventional standard bus specification cannot display images having quality as high as ordinary TV images, when it uses a standardized PC card in order to process moving-picture data. To display images having quality as high as TV images, the computer must have its system bus replaced by a high-speed system bus. If provided with a high-speed system bus, the computer will be expensive, consume more power and become complex in structure.

SUMMARY OF THE INVENTION

An object of the present invention is to provide a portable computer which has a conventional standardized system bus and which can yet process moving-picture data to display high-quality pictures, by using a novel, high-speed option card in addition to a conventional option card.

Another object of the invention is to provide a portable computer which is relatively simple in structure and which can use not only a conventional option card to process data, but also a new option card to process moving-picture data and to display high-quality moving pictures, by the use of a conventional standardized system bus.

Still another object of the present invention is to provide an option card which can be used in a portable computer having a conventional standardized system bus and an option-card slot and which enables the computer to easily process moving-picture data representing high-quality pictures.

To achieve the objects described above, there are provided two portable computers according to this invention.

The first portable computer according to the present invention comprises a card connection port; a card controller for controlling transfer of data to and from a card connected to the card connection port; a display controller for processing moving-picture data to display moving pictures; a moving-picture bus provided between the card controller and the display controller; a system bus connecting the card controller to the display controller; and a switching control circuit provided in the card controller, for selectively connecting the card connection port to the moving-picture bus or to the system bus.

The second portable computer according to this invention comprises a card connection port such as a PCMCIA card slot; a card controller for controlling transfer of data to and from a card, such as a PCMCIA card, connected to the card connection port; a moving-picture bus connecting the card controller to a display controller, for transferring moving-picture data directly to the display controller capable of processing moving-picture data to display moving pictures; a system bus connecting the card controller to the display controller; and a switching control circuit provided in the card controller, for selectively connecting the card connection port to the moving-picture bus or to the system bus.

When a conventional card such as a communication card may be connected to the card connection port of either portable computer according to the invention, the switching control circuit provided in the card controller connects the card connection port to the system bus. Now that the conventional card is connected to the card connection port, it can perform the extension function, such as communications function, which is specific to it can be performed. On the other hand, when a novel card which can process high-quality image data and which needs to receive and supply image data at high speed is connected to the card connection port, the switching control circuit connects the card connection port to the moving-picture bus. The novel card, now connected to the card connection port, can perform its function, i.e., processing high-quality image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a first embodiment of the present invention;

FIG. 2 is a table specifying the functions which are assigned to the terminals of the PCMCIA card slot of the first embodiment;

FIG. 3 is a table showing the functions which are assigned to the terminals while an MPEG decoder card or a moving-picture capture card remains in the PCMCIA card slot of the first embodiment;

FIGS. 5A, 5B and 5C illustrate a timing chart showing the digital sound data which the PCMCIA controller provided in the first embodiment outputs through the audio signal line while an MPEG decoder card remains in the PCMCIA card slot;

FIG. 6 is a block diagram showing a second embodiment of the present invention;

FIG. 7 is a table explaining the functions assigned to the terminals of the PCMCIA card slot of the second embodiment;

DETAILED DESCRIPTION OF THE PREFERRED EMBODIMENTS

Figure 4:
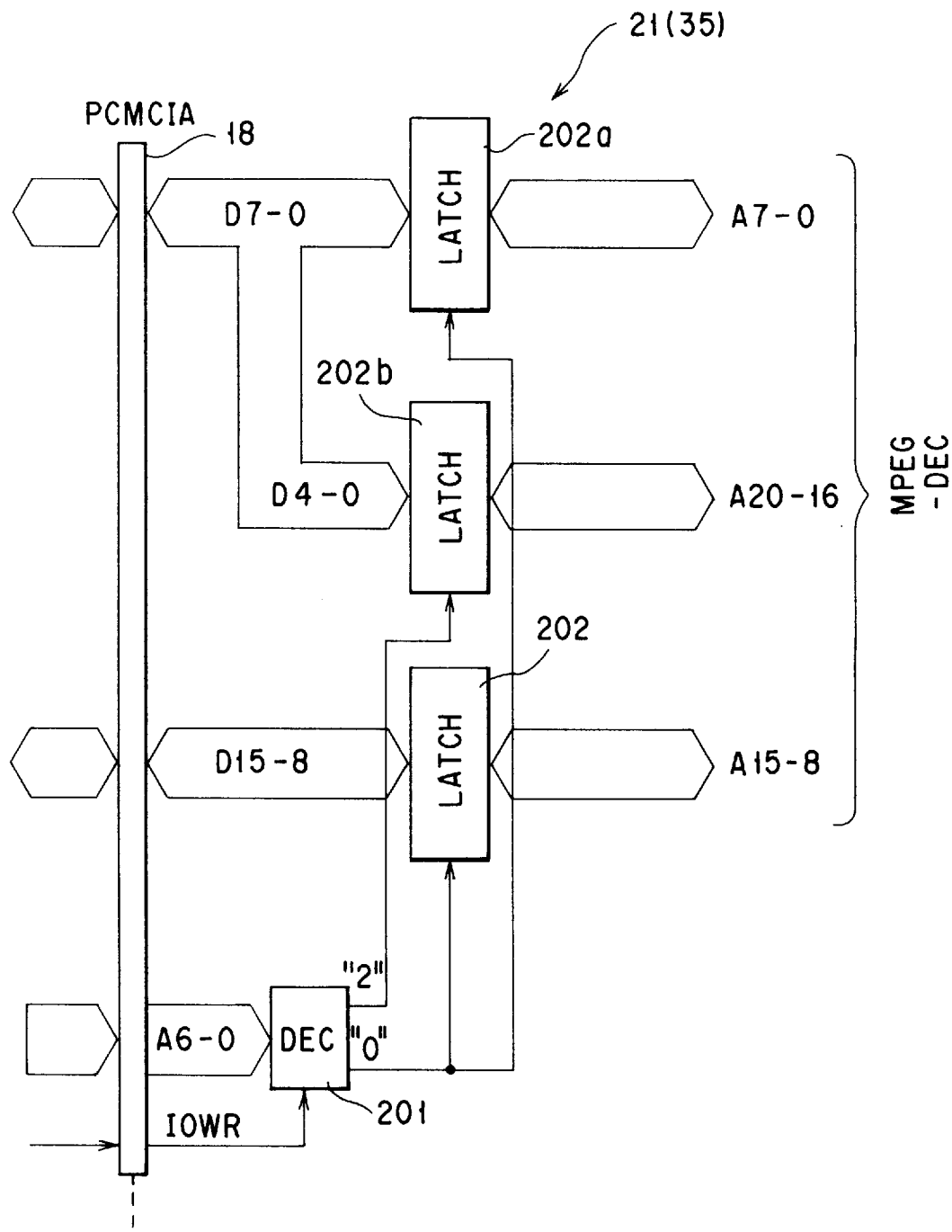
FIG. 4 is a diagram illustrating the address latch unit provided in the MPEG interface (I/F) which is incorporated in an MPEG decoder card.

An embodiment of the invention will be described, with reference to the accompanying drawings.

FIG. 1 is a block diagram showing a personal computer 1 (hereinafter referred to as "PC") which is the first embodiment. The PC 1 has a standard system bus, a card slot and a card interface. The system bus is, for example, an ISA bus. The card interface is connected to the system bus, for enabling various PC cards to perform extension functions. Among the PC cards is one which can process high-quality image data.

Two PC cards are shown in FIG. 1. They are an MPEG decoder card 2 and a moving-picture capture card 3. Either card is a novel PC card which can be connected to the card slot of the PC 1 and which can process high-quality image data.

The MPEG decoder card 2 is designed to expand the compressed sound and image data stored in a CD-ROM or the like and supply the expended data to the PC 1. The MPEG decoder card 2 incorporates an MPEG interface (I/F) 21, a CIS (Card Information Structure) 22, a COR (Configuration Option Register) 23, an MPEG sound decoder (MPEG Sound) 24, an MPEG video decoder (MPEG Video) 25, a RAM 26, and the like. When "1" supplied from the PC 1 is set in the COR 23, the signals at the terminals of the card 2 are switched to the B-mode significance which designates, as shown in FIG. 3, a card interface provided for a novel PC card capable of processing high-quality image data. The MPEG interface (I/F) 21 has an address latch unit having the structure shown in FIG. 4. As shown in FIG. 3, an MPEG address consists of 21 bits. The 21 bits (A0 to A20) constituting the MPEG address can be input after "1" has been set in the COR 23. How to control this address will be explained later.

The moving-picture capture card 3 is designed to fetch image data, such as TV or VTR image data, into the PC 1, enabling a display connected to the PC 1 to display images. The moving-picture capture card 3 incorporates a CIS, a COR, a sound A/D converter (Sound A/D), and a video decoder. The CIS and the COR are of the same time as those provided in the MPEG decoder card 2. The sound A/D converter converts analog stereophonic sound signals to digital serial stereophonic sound data. The video decoder separates NTSC video signals, PAL video signals or the like into Y (luminance) signals and UV (chrominance) signals and outputs the Y signals the UV signals, together with sync signals.

The PC 1 comprises a system bus 10, a CPU 11, a main memory 12, two external memories 13 and 14, an audio controller 15, a PCMCIA controller 16, an multimedia display controller (MMDC) 17, a PCMCIA card slot 18, a moving-picture bus 19A, and an audio signal line 19B.

The system bus 10 is of standard specification, provided for transferring data among the CPU 11, the memories 12, 13 and 14 and various I/O ports. It is, for example, an ISA bus (ISA-BUS).

The CPU 11 controls the other components of the PC 1. It controls a PCMCIA driver (later described) in accordance with the PCMCIA control program stored in the main memory 12 to make the PCMCIA controller 16 select the moving-picture bus 19A so that either the MPEG decoder card 2 or the moving-picture capture card 3 may be used to process moving-picture data of high quality.

The main memory 12 has a program area and a work area. Stored in the program area are various programs which the CPU 11 accesses. One of the programs stored in the program area is a PCMCIA driver (PCMCIA-DRV) 12A included in a PCMCIA control program. When the PCMCIA driver is access-controlled by the CPU 11, the PC 1 can use a conventional PC card (e.g., a communications card), or either the MPEG decoder card 2 or the moving-picture capture card 3 to process the high-quality moving-picture data.

The first external memory 13 is a hard disk drive (HDD), and the second external memory 14 is a CD-ROM. Either external memory has a large storage capacity. Compressed image data and sound data can be written into and read from these external memories under the control of the CPU 11.

The audio controller (Audio-CONT) 15 controls the inputting and outputting of sound data under the control of the CPU 11. The controller 15 comprises an A/D converter 15a, a D/A converter 15b, and two multiplexers 15c and 15c. The A/D converter 15a converts the analog signals of audible frequency band, input by a microphone (MIC) or through a LINE input (not shown), into digital data. The D/A converter 15b converts the digital sound data into analog sound signals and supplies the analog sound signals to a speaker. The multiplexer 15c selects the digital sound data output from the A/D converter 15a and the digital sound data output from the PCMCIA controller 16 through the audio signal line 19B, and supplies the selected data to the system bus 10. The multiplexer 15d selects the digital sound data on the system bus 10 and the digital sound data on the audio signal line 19B, and supplies the selected data to the D/A converter 15b.

The PCMCIA controller (PCMCIA-CONT) 16 controls the writing data into, and the reading data from, various PC cards. This controller 16 can control the switching between two operating modes A and B. In the mode A of ordinary card interface specification, the PC 1 can use a conventional PC card such as a communications card. In the mode B of special card interface specification, the PC 1 can use a novel PC card such as the MPEG decoder card 2 or the moving-picture capture card 3, to process high-quality moving-picture data. The PCMCIA controller 16 comprises a switching control circuit (CONT) 16a and a control register (Reg) 16b. The control circuit 16a selects either a mode-A terminal or a mode-B terminal so that data can be transferred between the CPU 11 and the conventional PC card (e.g., a communications card) via the system bus 10 or between the CPU 11 and a novel PC card (i.e., the MPEG decoder card 2 or the moving-picture capture card 3) via the moving-picture bus 19A.

The control register 16b holds mode-control bits, each of which is set at "1" to designate the mode B so that the novel PC card may be used, or at "0" to designate the mode A so that a conventional PC may be used. More precisely, the mode-control bits are set at "1," thus designating the mode B, when the CPU 11 executing the PCMCIA driver (PCMCIA-DRV) 12A determines that the MPEG decoder card 2 or the moving-picture capture card 4 has been connected to the PCMCIA card slot 18. The mode-control bits are set at "0," designating the mode A, when the CPU 11 determines that a conventional PC card has been connected to the PCMCIA card slot 18.

Figure 8:
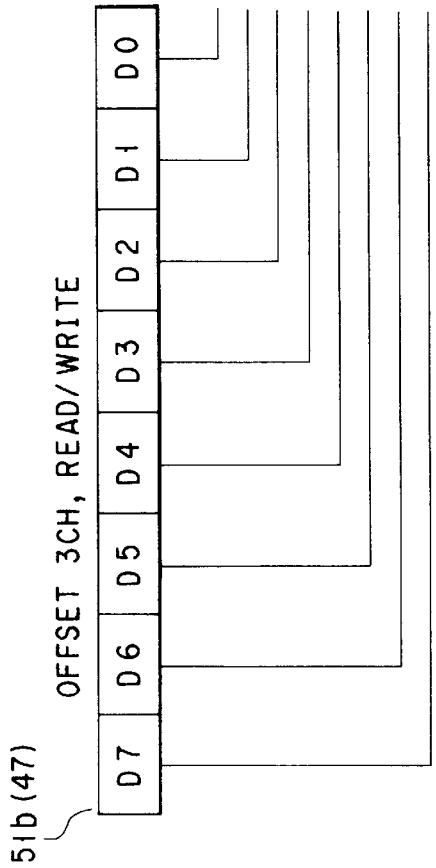
FIG. 8 is a block diagram showing, in detail, the control register 16b shown in FIG. 6.

FIG. 8 shows the bit assignment of the control register 16b. Note that the COR 23 described above has also the bit assignment shown in FIG. 8. As shown in FIG. 8, the least significant bit D0 of the control register 16b is a video control bit. When the bit D0 is set at "1," the PC 1 is set into the mode B and the PC 1 can use the MPEG decoder card 2 or the moving-picture capture card 4. Hence, the expended image data from the MPEG decoder card 2 can be supplied to the multimedia display controller 17 through the moving-picture bus 19A. The second least significant bit D1 of the control register 16b is an audio control bit. When the bit D1 is set at "1," the PC 1 is set into the mode B and the PC 1 can use the MPEG decoder card 2 or the moving-picture capture card 4. Hence, the audio data from the MPEG decoder card 2, the moving-picture capture card 3 or an MIDI card (not shown) which process audio signals only can be supplied to the audio controller 15 through the audio signal line 19B. The most significant bit D7 of the control register 16b is a revision bit. When set at "1," the bit D7 indicates that the PCMCIA controller 16, which is a gate array, is programmable. The most significant bit D7 is read-only; its value has been written by, for example, the manufacturer of the PC 1.

As described above, the switching control circuit 16a selects either the mode-A terminal to transfer data between the CPU 11 and the conventional PC card via the system bus 10, or the mode-B terminal to transfer data between the CPU 11 and a novel PC card (i.e., the MPEG decoder card 2 or the moving-picture capture card 3) via the moving-picture bus 19A. The terminals of the PCMCIA card slot 18, into which the conventional PC card or the novel PC card can be inserted, are assigned to various functions as shown in FIGS. 2 and 3. The functions of these terminals as shown in FIG. 3 are performed while the novel PC card remains in the PCMCIA card slot 18.

Figure 9:
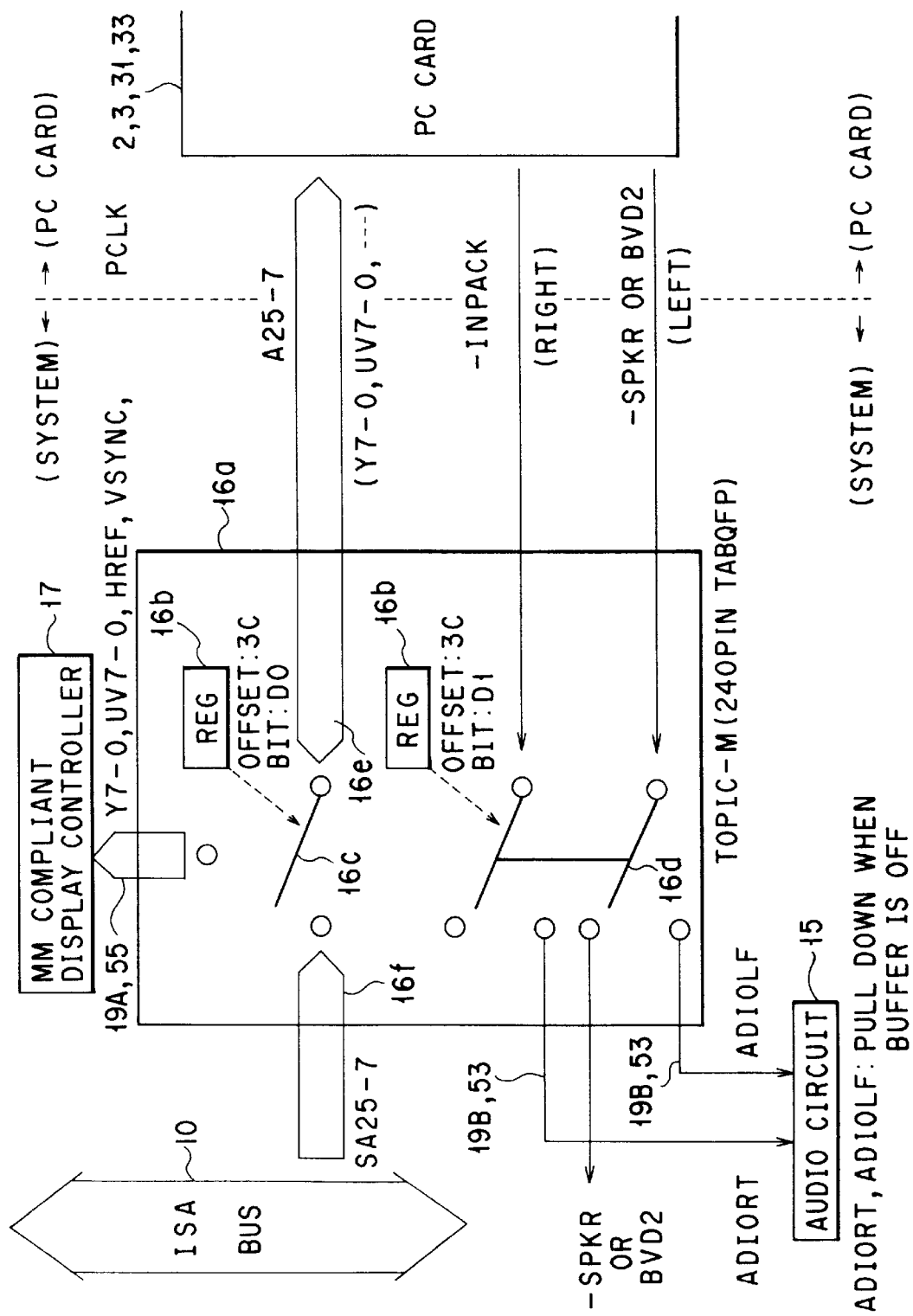
FIG. 9 is a block diagram illustrating, in detail, the switching control circuit 16a shown in FIG. 6.

The switching control circuit 16a will now be described in detail, with reference to FIG. 9. As shown in FIG. 9, the circuit 16a has switches 16c and 16d, each of which is a multiplexer or the like. The switch 16c is set in standard mode (FIG. 7) when the least significant bit D0 has the value of "0." To be more specific, the switch 16c connects a bus 16e to a bus 16f, whereby address data A7-25 is supplied from the CPU 11 to the PC card 2 or 3 through the system bus 10. When the least significant bit D0 has the value of "1," the switch 16c is set in multimedia mode. More precisely, the switch 16c connects the bus 16e to the moving-picture bus 19A, whereby an 8-bit luminance signal Y7-0, an 8-bit chrominance signal UV7-0, a horizontal sync signal HREF, a vertical sync signal VSYNC and a pixel clock signal PCLK are supplied to the multimedia display controller 17. As shown in FIG. 7, the 8-bit luminance signal Y7-0 is output to the moving-picture bus 19A through the 47th to 56th pins (terminals A18 to A21) and the 53rd to 56th pins (terminals A22 to A25)—all shown in FIG. 2 which illustrates PCMCIA terminal assignment. The 8-bit chrominance signal UV7-0 is output to the moving-picture bus 19A through the eighth pin (terminal A10), the 10th to 14th pins (terminals A11 to 14), the 19th pin (terminal A16), the 20th pin (terminal A15) and the 46th pin (terminal A17)—all shown in FIG. 2, too.

In the present embodiment, the multimedia-mode signals (Y7-0, UV7-0), HREF, VSYNC and PCLK) are assigned to the most significant bit (A25) and et seq., respectively, thereby to prevent inconvenience that may occur if existing PCMCIA terminals are utilized. More specifically, as shown in FIG. 4, address A7 is output in time-division fashion, through the sixth pin (terminal D7) of PCMCIA assignment (FIG. 2); addresses A8 to A15 are output in time-division fashion, through the 64th to 66th pins (terminals D8 to D10) and 37th to 41st pins (terminals D11 to D15) of PCMCIA assignment (FIG. 2); addresses A16 to A20 are output in time-division fashion, through the 30th to 32nd pins (terminals D4 to D2) and the second and third pins (terminals D3 and D4) of PCMCIA assignment (FIG. 2). Since the addresses A0 to A20 are supplied in time-division fashion to the MPEG decoder card 2 through the terminals D0 to D15, there will occur no inconvenience even though the multimedia signals are output through the address terminals A7 to A25.

When the bit D1 of the control register 16b is set at "1," the switch 16d connects the -SPKR and -INPACK terminals of the PC card 2 or 3 to the audio signal line 19B. As a result, an audio left PWM signal and an audio right PWM signals are supplied from the -SPKR and -INPACK terminals to the audio controller 15 through the audio signal line 19B.

The multimedia display controller (MMDC) 17 is designed to control the outputting of image data such as MPEG or TV moving picture data, still image data (graphics data) and the like. The controller 17 comprises a video display control circuit (Video) 17a, a graphics display control circuit (Graphics) 17b, and a multiplexer (MUX) 17c. The video display control circuit 17a has a video buffer for storing video data and an YUV-RGB converter for converting the YUV data stored in the video buffer to RGB signals. The graphics display control circuit 17b has a unit for accessing an RAM storing graphics data and a graphics data buffer for temporarily storing the graphics data. The multiplexer 17c selects either the data output from the video display circuit 17a or the data output from the graphics display control circuit 17b, and supplies this data to the LCD display panel (LCD) mounted on the PC 1 or to an external CRT monitor (CRT).

The structure and operation of the multimedia display controller 17 will not be described in detail since they are disclosed in, for example, Jpn. Pat. Appln. KOKAI Publication No. 5-121305 (title: Multimedia Display Control System Having a Frame Buffer for Storing Image Data).

As indicated above, to the PCMCIA card slot 18 there can be connected not only a conventional PC card such as a communications card, but also a novel PC card such as the MPEG decoder card 2 or the moving-picture capture card 3. The slot 18 has terminals, which are shown in FIG. 2. The terminals are assigned to the functions specified in FIG. 3, while MPEG decoder card 2 or the moving-picture capture card 3 remains in the PCMCIA card slot 18.

The moving-picture bus 19A extends between the PCMCIA controller (PCMCIA-CONT) 16 and the multimedia display controller (MMDC) 17, for transferring moving-picture data only. The bus 19A has 20 signal lines which are connected to the 20 terminals of the PCMCIA card slot 18 which are generally designated at "A" in FIG. 3. To state more precisely, the signal lines are connected to the terminals A25 to A18, terminals A17 to A10, terminals A9 to A7, and terminal -IOS16. The bus 19A serves to transfer moving-picture data, including the clock signal and sync signals output from the switching control circuit 16a, at high speed and directly to the video display control circuit 17a of the multimedia display controller 17. The signals transferred through the bus 19A and the direction in which they are transferred are illustrated at "A" in FIG. 3, and will be later described in detail.

The audio signal line 19B is a signal line for transferring 3-bit digital sound data (see "B" in FIG. 3 and FIG. 5C) from the PCMCIA controller 16 to the audio controller 15. The signals transferred via the line 19B will be later described.

FIG. 2 is a table specifying the functions which are assigned to the terminals of the PCMCIA card slot 18. FIG. 3 is a table showing the functions which are assigned to the terminals while an MPEG decoder card or a moving-picture capture card remains in the PCMCIA card slot 18. Of the terminals of the slot 18, twenty terminals A15 to A18, A17 to A10, A9 to A7 and -IOIS16 whose pin numbers are 37 to 50, 53 to 56, 8, 10 to 14, 19 to 22, 46 and 33, respectively, and which are shown at "A" in FIG. 3, and three terminals SPKR, INPACK and STSCHG whose pin numbers are 60, 62 and 63, respectively, and which are shown at "B" in FIG. 3 are switched in their function. Thus, twenty-three terminals, in total, are switched in function.

When the moving-picture capture card 3 is inserted to the PCMCIA card slot 18, the twenty terminals (A15 to A18, A17 to A10, A9 to A7 and -IOIS16) are assigned to the function of transferring moving-picture data from the card 3 to the PC 1, while the three terminals (-SPKR, -INPACK and -STSCHG) are assigned to the function of transferring audio data and sound data from the card 3 to the PC 1 (more precisely, to the audio controller 15).

In FIG. 3, Y7-0 indicates an 8-bit luminance signal, UV7-0 a chrominance signal, HREF or HS a horizontal sync signal, VS is a vertical sync signal, (LLC2) a clock signal, and ODD an interlace field designating signal (odd/even). Further, in FIG. 3, SDATA indicates a serial stereophonic sound data, FSYNC a left/right designating signal, and SCK a sync clock signal for dividing the serial stereophonic sound data into 16-bit units. The data SDATA, the signal FSYNC and the signal SCK are illustrated in detail in FIGS. 5A, 5B and 5C, respectively.

When the MPEG decoder card 2 is inserted to the PCMCIA card slot 18, the twenty terminals (A15 to A18, A17 to A10, A9 to A7 and -IOIS16), shown at "A" in FIG. 3, are assigned to the function of transferring moving-picture data from the card 2 to the PC 1. In this case, twenty-two bits are required to designate an address, and use is made of the address transfer means which is incorporated in the MPEG interface 21, which has data lines (D15–D0) shown in FIG. 4 and which is controlled in time-division fashion.

FIG. 4 illustrates the address latch unit, or the address transfer means, provided in the MPEG interface (I/F) 21. The address latch unit is provided in the MPEG decoder card 2 since twenty-one bits (A20 to A0) are required to designate an address as is evident from FIG. 3. As shown in FIG. 4, the address latch unit comprises a decoder DEC 201 and three latch circuits (LATCH) 202a, 202b and 202c. The decoder DEC is connected to the data lines D15 to D0. Time-division control data is supplied to the decoder DEC. When the output of the decoder DEC is "0," the latch circuits 202a and 202c latch two 8-bit addresses (A7–A0 and A15–A8), respectively, whereby the address latch unit latches 16 bits in all. When the output of the decoder DEC is "2," the latch circuit 202b latches a 5-bit address (A20 to A16), which is supplied to the MPEG sound decoder (MPEG Sound) 24 and the MPEG video decoder (MPEG Video) 25.

Figures 5A, 5B, 5C:
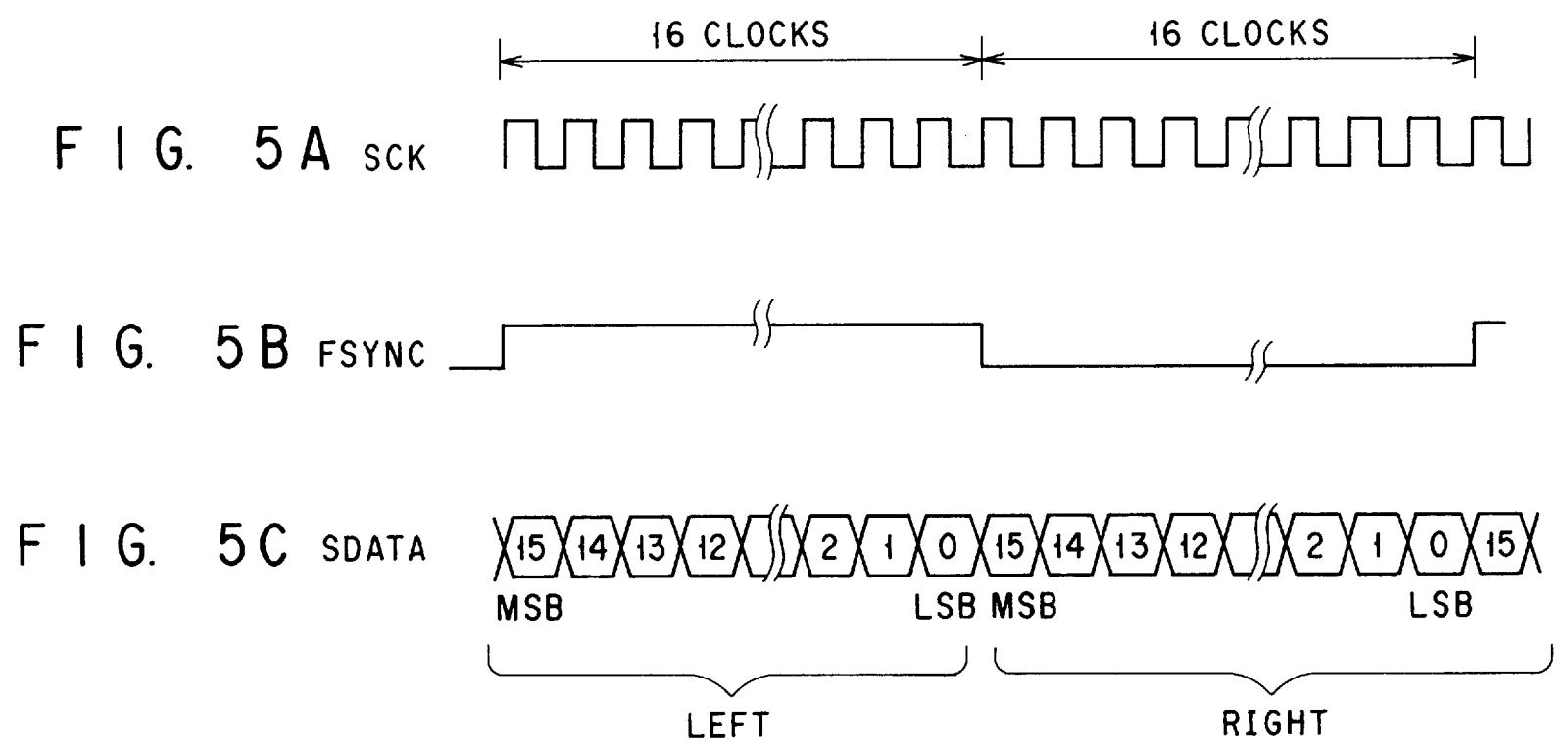

FIGS. 5A, 5B and 5C illustrate a timing chart showing the digital sound data (serial stereophonic sound data) which the PCMCIA controller 16 outputs through the audio signal line 19B while the MPEG decoder card 2 remains in the PCMCIA card slot 18. The serial stereophonic sound data consists of serial stereophonic sound data SDATA shown in FIG. 5C, 1-bit sync clocks SCK shown in FIG. 5A, and 1-bit left/right designating signals FSYNC. The sync clocks SCK divide the data SDATA into 16-bit units. Each signal FSYNC designates either the left-speaker sound or the right-speaker sound.

The operation of the personal computer will be explained.

When the personal computer is initialized, the CPU 11 executes the PCMCIA control program stored in the main memory 12, determining the type of the card inserted to the PCMCIA card slot 18.

If the CPU 11 determines that the card in the slot 18 is the MPEG decoder card 2, the mode control bit of COR 23 incorporated in the MPEG decoder card 2 is set at "1," designating the mode B in which the PC 1 can use a novel PC card to process high-quality moving-picture data. Furthermore, the mode control bit of the control register 16b provided in the PCMCIA controller 16 is set at "1." The MPEG interface 21 provided in the MPEG decoder card 2 detects an address set at the address-transferring timing shown in FIG. 4. The compressed moving-picture data and the sound data accompanying the moving-picture data, which have been read from, for example, the CD-ROM 14, are thereby input to the PC 1 through the signal interface shown in FIG. 3. These data items are stored into the RAM 26 and supplied to the MPEG sound decoder 24 and the MPEG video decoder 25. The decoder 24 expands the compressed moving-picture data, and the decoder 25 expands the sound data. The moving-picture data and the sound data, thus expanded, are supplied back to the PC 1. In the PC 1, the expanded moving-picture data is supplied at high speed to the multimedia display controller 17 through the moving-picture bus 19A under the control of the switching control circuit 16a which is provided in the PCMCIA controller 16. The multimedia display controller 17 controls the LCD display panel mounted on the PC 1 or to an external CRT monitor, which displays the moving picture represented by the expanded moving-picture data. Meanwhile, the expanded sound data is supplied to the audio controller 15 with the timing as shown in FIG. 5C. The audio controller 15 controls the speaker, which generates sound represented by the expanded sound data.

If the CPU 11 determines that the card in the slot 18 is the moving-picture capture card 3, the mode control bit of COR 23 incorporated in the MPEG decoder card 2 is set at "1." In this case, as well, the mode B is designated in which the PC 1 can use a novel PC card to process high-quality moving-picture data, and the mode control bit of the control register 16b provided in the PCMCIA controller 16 is set at "1." Image data such TV data or VTR data is fetched into the PC 1. In the PC 1, the image data is supplied at high speed to the multimedia display controller 17 through the moving-picture bus 19A under the control of the switching control circuit 16a which is provided in the PCMCIA controller 16. The multimedia display controller 17 controls the LCD display panel mounted on the PC 1 or to an external CRT monitor, which displays the moving picture represented by the expanded moving-picture data.

As described above, when a conventional PC card such as a communications card is connected to the PCMCIA card slot 18, the switching control circuit 16a of the PCMCIA controller 16 connects the PCMCIA card slot 18 to the system bus 10, enabling the conventional PC card to perform the extension function (e.g. communications function) which is specific to the PC card. When a novel PC card, such as the MPEG decoder card 2 or the moving-picture capture card 3, the switching control circuit 16a connects the PCMCIA card slot 18 to the moving-picture bus 19A, enabling the novel PC card to expand high-quality image data.

A personal computer according to the second embodiment of the present invention will now be described, with reference to FIGS. 6 to 9. The components and items similar to those of the first embodiment are denoted at the same reference numerals and symbols as in FIGS. 1 to 4 and FIGS. 5A to 5C, and will not be described in detail.

FIG. 6 is a block diagram illustrating the second embodiment. As shown in FIG. 6, the audio signal supplied through the audio signal line 19B is a PWM (Pulse Width Modulation) signal, whereas a PCM (Pulse Code Modulation) signal is supplied through the audio signal line 19B in the first embodiment. The second embodiment can use a novel PC card, either an MPEG decoder card 31 or a moving-picture capture card 33, as well as a conventional PC card. Both novel PC cards 31 and 33 can be connected to the card slot of a PC 1. The MPEG decoder card 31 is designed to expand the compressed sound and image data stored in a CD-ROM or the like and supply the expanded data to the PC 1. The MPEG decoder card 31 incorporates an MPEG interface (I/F) 21, a CIS (Card Information Structure) 22, a COR (Configuration Option Register) 23, an MPEG sound decoder (MPEG Sound) 24, an MPEG video decoder (MPEG Video) 25, a RAM 26, a configuration register 27 and the like. When "1" supplied from the PC 1 is set in the configuration register 28, the signals at the terminals of the card 31 are switched to the mode significance which designates, as shown in FIG. 7, a card interface provided for a novel PC card capable of processing high-quality image data. The MPEG interface 21 has an address latch unit having the structure shown in FIG. 4. As shown in FIG. 7, an MPEG address consists of 21 bits. The 21 bits (A0 to A20) constituting the MPEG address can be input after "1" has been set in the configuration register 27. How to control this address will be explained later.

The moving-picture capture card 33 is designed to fetch image data, such as TV or VTR image data, into the PC 1, enabling a display connected to the PC 1 to display images. The moving-picture capture card 33 incorporates a CIS, a COR, a configuration register 27, a PWM generator, and a video decoder. The CIS, the COR and the register 27 are of the same type as those provided in the MPEG decoder card 31. The PWM generator converts analog stereophonic sound signals into PWM stereophonic sound data. The video decoder separates video signals such as NTSC signals, PAL signals or the like into Y (luminance) signals and UV (chrominance) signals and outputs the Y signals the UV signals, together with sync signals.

The PC 1 comprises a system bus 10, a CPU 11, a main memory 12, two external memories 13 and 14, a PCMCIA controller 16, an multimedia display controller (MMDC) 17, a PCMCIA card slot 18, a moving-picture bus 55, an audio signal line 53, and an audio controller 49.

The audio controller (Audio-CONT) 49 controls the inputting and outputting of sound data under the control of CPU 11. The controller 49 comprises an A/D converter 49a, a D/A converter 49b, a multiplexer 49c and a filter 49d. The filter 49d converts the PWM sound data output from the PCMCIA controller 16 through audio signal line 53, into analog signals. The multiplexer (MUX) 49c selects analog signals supplied from a microphone (MIC) or through a signal line (not shown), or the analog signals supplied from the filter 49d. The A/D converter 49a converts analog signals of audible frequency band, selected by the multiplexer 49d, into digital data. The D/A converter 49b converts the digital sound data into analog sound signals and supplies the analog sound signals to a speaker. The analog signals from the D/A converter 49b and the analog signals from the filter 49d are combined, and the resultant composite signals are output from the audio controller (Audio-CONT) 49.

The PCMCIA controller (PCMCIA-CONT) 16 controls the writing data into, and the reading data from, various PC cards. This controller 16 can control the switching between two operating modes A and B. In the mode A of ordinary card interface specification, the PC 1 can use a conventional PC card such as a communication card. In the mode B of special card interface specification, the PC 1 can use a novel PC card such as the MPEG decoder card 31 or the moving-picture capture card 33, to process high-quality moving-picture data. The PCMCIA controller 16 comprises a switching control circuit (CONT) 16a and a control register (Reg) 16b. The control circuit 16a selects either a mode-A terminal or a mode-B terminal so that data can be transferred between the CPU 11 and the conventional PC card (e.g., a communication card) via the system bus 10 or between the CPU 11 and a novel PC card (i.e., the MPEG decoder card 31 or the moving-picture capture card 33) via the moving-picture bus 55.

The control register 16b holds mode-control bits, each of which is set at "1" to designate the mode B so that the novel PC card may be used, or at "0" to designate the mode A so that a conventional PC may be used. More precisely, the mode-control bit is set at "1," thus designating the mode B, when the CPU 11 executing the PCMCIA driver (PCMCIA-DRV) 12A determines that the MPEG decoder card 31 or the moving-picture capture card 33 has been connected to the PCMCIA card slot 18. The mode-control bit is set at "0," designating the mode A, when the CPU 11 determines that a conventional PC card has been connected to the PCMCIA card slot 18.

The control circuit 16a selects either a mode-A terminal or a mode-B terminal in accordance with the mode-control bit in the control register 16b. When the mode-control bit is "0," thus designating the mode A, the circuit 16a connects the conventional PC card to the CPU 11 by the system bus 10. When the mode-control bit is "1," designating the mode B, the circuit 16a connects the novel PC card (i.e., the MPEG decoder card 31 or the moving-picture capture card 33) to the PC 1 by the moving-picture bus 55, as can be understood from FIG. 7.

The moving-picture bus 55 extends between the PCMCIA controller (PCMCIA-CONT) 16 and the multimedia display controller (MMDC) 17, for transferring moving-picture data only. The bus 55 has 19 signal lines which are connected to the 19 terminals (A25 to A18, A17 to A10, A9 to A7) of the PCMCIA card slot 18, as shown in FIG. 7. The bus 55 serves to transfer moving-picture data, including the clock signal and sync signals output from the switching control circuit 16a, at high speed and directly to the video display control circuit 17a of the multimedia display controller 17. The signals transferred through the bus 55 and the direction in which they are transferred are illustrated in FIG. 7, and will be later described in detail.

The audio signal line 53 is a signal line for transferring 2-bit audio PWM signals (i.e., signals LEFT and RIGHT shown FIG. 7) output from the PCMCIA controller 16 to the audio controller 49. The signals transferred via the line 53 will be later described.

In the second embodiment, of the terminals of the PCMCIA card slot 18, eighteen terminals A25 to A18, A17 to A10, A9 to A7 whose pin numbers are 47 to 50, 53 to 56, 8, 10 to 14 and 19 to 22, 46 and 33 (see FIG. 7), and two terminals -SPKR and -STSCHG whose pin numbers are 62 and 63 (see FIG. 7) are switched in their function. Thus, twenty-one terminals, in total, are switched in function.

When the moving-picture capture card 33 is inserted to the PCMCIA card slot 18, the nineteen terminals (A25 to A18, A17 to A10, and A9 to A7) are assigned to the function of transferring moving-picture data from the card 33 to the PC 1, while the two terminals (-SPKR and -STSCHG) are assigned to the function of transferring audio data and sound data from the card 33 to the PC 1 (more precisely, to the audio controller 49).

In FIG. 7, Y7-0 indicates an 8-bit luminance signal, UV7-0 a chrominance signal, HREF a horizontal sync signal, VSYNC is a vertical sync signal, and PCLK a pixel clock signal. Further, in FIG. 7, LEFT indicates an audio left PWM signal, and RIGHT an audio right PWM signal.

When the MPEG decoder card 31 is inserted to the PCMCIA card slot 18, the nineteen terminals (A25 to A18, A17 to A10, and A9 to A7), shown in FIG. 7, and the terminals A6 to A0 and D15 to D0, which are not switched in function, are used to transfer moving-picture data between the card 33 and the PC 1. In this case, twenty-one bits are required to designate an address, and use is made of the address transfer means which is incorporated in the MPEG interface 21, which has data lines (D15–D0) shown in FIG. 4 and which is controlled in time-division fashion.

FIG. 4 illustrates the address latch unit, or the address transfer means, provided in the MPEG interface (I/F) 21 of the MPEG decoder card 33. As shown in FIG. 4, in the multimedia mode, addresses are transferred between the PC 1 and the PC card through the data bus (D15 to D0) in time-division fashion. The addresses need to be latched by the address latch unit through the data bus (D15 to D0) since the moving-picture data (Y7-O, UV7-0), the signals HREF, VSYNC and PCLK and the audio PWM signals are transferred via the address pins A25 to A7 and the -SPKR and -INPAK pins in the multimedia mode. The 16 lower bits whose address values frequently changes are distributed to two latch circuits 202a and 202c and the upper bits (A20 to A16) whose address values change less frequently are distributed to the latch circuit 202b. Either the upper bits or the lower bits are selected in accordance with the output ("0" or "1") of a decoder 201. As shown in FIG. 7, twenty-one bits (A20–0) are required to designate an address. Therefore, as shown in FIG. 4, the address transfer means is provided using the data lines (D15–0) according to the time-division fashion. Time-division control data is sequentially supplied to the decoder 201 connected to the address lines (A6–0). When the output of the decoder 201 is "0," the latch circuits 202a and 202c latch two 8-bit addresses (A7–A0 and A15–A8), respectively, whereby the address latch unit latches 16 bits in all. When the output of the decoder 201 is "2," the latch circuit 202b latches a 5-bit address (A20 to A16). The contents of the latch circuits 202a, 202b, 202c are supplied to the MPEG sound decoder (MPEG Sound) 24 and the MPEG video decoder (MPEG Video) 25. Time-division control data fed to the decoder 201 via the address lines A6–0 is supplied from, for example, a card driver.

The operation of the personal computer according to the second embodiment will be explained.

When the personal computer is initialized, the CPU 11 executes the PCMCIA control program stored in the main memory 12, determining the type of the card inserted to the PCMCIA card slot 18.

If the CPU 11 determines that the card in the slot 18 is the MPEG decoder card 31, each bit of the control register 16b and each bit of the configuration register 27 are set at "0" due to the process of the PCMCIA driver (PCMCIA-DRV) 12A. As a result, the address from the CPU 11 is supplied to the MPEG decoder card 31 through the ISA bus 10. The compressed moving-picture data and the sound data accompanying the moving-picture data, which have been read from the CD-ROM 14, are thereby stored in the RAM 26 incorporated in the card 31, using the ordinary PCMCIA pin assignment. In the card 31, the MPEG sound decoder 24 expands the compressed moving-picture data, and the MPEG video decoder 25 expands the sound data. Next, the PCMCIA driver (PCMCIA-DRV) 12A sets "1" in the control register 16b and the configuration register 27. Then, the card 31 supplies back the moving-picture data and the sound data, thus expanded, to the PC 1. In the PC 1, the expanded moving-picture data is supplied at high speed to the multimedia display controller 17 through the moving-picture bus 55 under the control of the switching control circuit 16a which switches the terminals of the slot 18 in function as illustrated in FIG. 7. The multimedia display controller 17 controls the LCD display panel mounted on the PC 1 or to an external CRT monitor, which displays the moving picture represented by the expanded moving-picture data. Meanwhile, the expanded sound data is supplied to the audio controller 49 through the audio signal line 53. The audio controller 49 controls the speaker, which generates sound represented by the expanded sound data.

If the CPU 11 determines that the card in the slot 18 is the moving-picture capture card 33, the configuration register 27 is set at "1." In this case, as well, the mode B is designated in which the PC 1 can use a novel PC card to process high-quality moving-picture data. Also, the control register 16b provided in the PCMCIA controller 16 is set at "1." In the case of the moving-picture capture card 33, image data such TV data or VTR data is fetched into the PC 1. In the PC 1, the image data is supplied at high speed to the multimedia display controller 17 through the moving-picture bus 55 under the control of the switching control circuit 16a which switches the terminals of the slot 18 in function as illustrated in FIG. 7. The multimedia display controller 17 controls the LCD display panel mounted on the PC 1 or to an external CRT monitor, which displays the moving picture represented by the expanded moving-picture data.

As described above, when a conventional PC card such as a communication card is connected to the PCMCIA card slot 18, the switching control circuit 16a of the PCMCIA controller 16 connects the PCMCIA card slot 18 to the system bus 10, enabling the conventional PC card to perform the extension function (e.g. communications function) which is specific to the PC card. When a novel PC card, such as the MPEG decoder card 31 or the moving-picture capture card 33, the switching control circuit 16a connects the PCMCIA card slot 18 to the moving-picture bus 55, enabling the novel PC card to expand high-quality image data.

In the first and second embodiments, an MPEG decoder card and a moving-picture card 33 are used as novel PC cards. Nonetheless, novel PC cards of any other type which can process high-quality image data can be used in combination with the personal computer according to the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable computer comprising:
   a card connection port;
   a card controller for controlling transfer of data to and from a card connected to said card connection port;
   a display controller for processing moving-picture data to display moving pictures;
   a moving-picture bus connecting said card controller to said display controller;
   a system bus connecting said card controller to said display controller;
   means for determining a type of the card connected to said card connection port, generating a first instruction designating an ordinary card interface mode when the card is of a first type unable to process high-quality moving-picture data, and generating a second instruction designating a special card-interface mode when the card is of a second type able to process high-quality moving-picture data; and
   a switching control circuit for connecting said card connection port to said system bus in response to the first instruction, and connecting said card connection port to said moving-picture bus in response the second instruction.

2. The portable computer according to claim 1, wherein said moving-picture bus includes data transfer paths for moving-picture data, a synchronizing signal and a clock signal.

3. The portable computer according to claim 1, wherein said switching control circuit is controlled by an output from a register provided in said card controller.

4. The portable computer according to claim 3, wherein said register stores data representing the type of the card connected to said card connection port.

5. The portable computer according to claim 3, wherein said card connection port has a plurality of terminals which are arranged in accordance with the PCMCIA standards and which are switched in function in accordance with an output from the register provided in said card controller.

6. A portable computer comprising:
   a card connection port;
   a card controller for controlling transfer of data to and from a card connected to said card connection port;
   a display controller for processing moving-picture data to display moving pictures;
   an audio controller for controlling transfer of audio data accompanying the moving-picture data;
   a storage device having a large storage capacity;
   a system bus connecting said card controller, said display controller, said audio controllers and said storage device;
   a moving-picture bus connecting said card controller to said display controller;
   an audio signal line connecting said card controller and said audio controller;
   means for determining a type of the card connected to said card connection port, generating a first instruction designating an ordinary card-interface mode when the card is of a first type unable to process high-quality moving-picture data, and generating a second instruction designating a special card-interface mode when the card is of a second type able to process high-quality moving-picture data; and
   a switching control circuit provided in said card controller, for connecting said card connection port to said system bus in accordance with the first instruction, and connecting said card connection port, said moving-picture bus, and said audio signal line in accordance with the second instruction, in a specific signal assignment.

7. The portable computer according claim 6, wherein said moving-picture bus includes data transfer paths for moving-picture data, a synchronizing signal and a clock signal.

8. The portable computer according to claim 6, wherein said switching control circuit is controlled by an output from a register provided in said card controller.

9. The portable computer according to claim 8, wherein said register stores data representing the type of the card connected to said card connection port.

10. The portable computer according to claim 8, wherein said card connection port has a plurality of terminals which are arranged in accordance with the PCMCIA standards and which are switched in function in accordance with an output from the register provided in said card controller.

11. The portable computer according to claim 6, wherein the audio data from said card is a PCM signal which consists of a synchronizing signal, a stereophonic R-L designating signal and serial sound data.

12. A portable computer comprising:

a plurality of card connection ports;

a card controller for controlling transfer of data to and from a card connected to any one of said card connection ports;

a display controller for processing moving-picture data to display moving pictures;

an audio controller for controlling transfer of audio data supplied from said card;

a system bus connecting said card controller, said display controller, and said audio controller;

a moving-picture bus connecting said card controller to said display controller;

an audio signal line connecting said card controller and said audio controller;

means for determining a type of the card connected to one of said card connection ports, generating a first instruction designating an ordinary card-interface mode when the card is of a first type unable to process high-quality moving-picture data, and generating a second instruction designating a special card-interface mode when the card is of a second type able to process high-quality moving-picture data; and a switching control circuit for connecting each of said card connection ports to said system bus in response to the first instruction, and to said moving-picture bus in response to the second instruction.

13. The portable computer according to claim 12, wherein the audio data supplied from the card is a PWM (Pulse Width Modulation) signal, and said audio controller has a filter for converting the PWM signal to an analog signal.

14. The portable computer according to claim 12, wherein said card is based on PCMCIA standards, the moving-picture data is supplied from said card through address pins, and the audio data is supplied from said card through digital audio signal pins and reserve pins.

15. The portable computer according to claim 14, wherein said moving-picture data consists of a luminance signal (Y7-0), a chrominance signal (UV7-0), a horizontal sync signal (HREF), a vertical sync signal (VSYNC) and a pixel-clock signal (PCLK) and is assigned to PCMCIA address pins (A25 to A7), and said audio data consists of an audio left PWM signal and an audio right PWM signal and is assigned to PCMCIA -SPKR and -INPACK pins.

16. The portable computer according to claim 12, wherein said switching control circuit is controlled by an output from a register provided in said card controller.

17. The portable computer according to claim 16, wherein said register stores data representing the type of the card connected to said card connection port.

18. The portable computer according to claim 16, wherein said card connection port has a plurality of terminals which are arranged in accordance with the PCMCIA standards and which are switched in function in accordance with an output from the register provided in said card controller.

19. A computer comprising:

a bus;

a first connection portion removably connected to a card having card data;

a detector to detect whether the card connected to said first connection portion has a moving-picture function, the card data being moving-picture data when the card has the moving-picture function;

a card controller having a second connection portion connected to said bus and a third connection portion connected to the first connection portion, the card controller controlling transfer of the card data from the card via the first connection portion to said bus when the detector detects that the card connected to said first connection portion has no moving-picture function; and a display controller having a fourth connection portion connected to said bus and a fifth connection portion connected to the first connection portion, the display controller processing the moving-picture data input through the fifth connection portion from the card via the first connection portion to display moving pictures when the detector detects that the card connected to said first connection portion has the moving-picture function.

20. A computer comprising:

a bus;

a connection portion removably connected to a card having card data;

a detector to detect whether the card connected to said connection portion has a moving-picture function, the card data being moving-picture data when the card has the moving-picture function;

a card controller, connected to said bus and the connection portion, to control transfer of the card data from the card via the connection portion to said bus when said detector detects the card connected to said connection portion does not have the moving-picture function; and a display controller, connected to said bus, having a receiving portion for receiving the moving-picture data supplied from the card through the connection portion, and processing the moving-picture data to display moving pictures when said detector detects the card connected to said connection portion has the moving-picture function.

21. A method for controlling transfer of card data supplied from a card removably connected to a computer having a card controller and a display controller, the card controller and the display controller being connected to a first bus and being connected together via a second bus, comprising the steps of:

detecting whether the card connected to the computer has a moving-picture function, the card data being moving-picture data when the card has the moving-picture function;

outputting the card data from the card to the first bus through the card controller when the card does not have the moving-picture function; and outputting the moving-picture data from the card to the display controller via the second bus when the card has the moving-picture function.

* * * * *

UNITED STATES PATENT AND TRADEMARK OFFICE
CERTIFICATE OF CORRECTION

PATENT NO. : 5,826,044
DATED : October 20, 1998
INVENTOR(S) : Hiroki ZENDA

It is certified that error appears in the above-indentified patent and that said Letters Patent is hereby corrected as shown below:

Claim 1, Col. 13, line 66, after "response", insert --to--.

Claim 6, Col. 14, line 28, "controllers" should read --controller,--.

Claim 7, Col. 14, line 50, after "according", insert --to--.

Signed and Sealed this

Seventh Day of September, 1999

*Attest:*

Q. TODD DICKINSON

*Attesting Officer*   *Acting Commissioner of Patents and Trademarks*